United States Patent [19]

Matthews et al.

[11] 4,169,730

[45] Oct. 2, 1979

[54] COMPOSITION FOR ATOMIZED ALLOY BRONZE POWDERS

[75] Inventors: Paul E. Matthews, Lawrenceville; Kenneth C. Ramsey, Pottersville, both of N.J.

[73] Assignee: United States Bronze Powders, Inc., Flemington, N.J.

[21] Appl. No.: 871,967

[22] Filed: Jan. 24, 1978

[51] Int. Cl.$^2$ ............................ C22C 9/00; C22C 9/02
[52] U.S. Cl. ........................................ 75/157; 75/251; 264/5
[58] Field of Search ................... 264/5, 6; 75/157, 251

[56] References Cited

U.S. PATENT DOCUMENTS

| 2,882,589 | 4/1959 | Stafford | 29/182 |
| 2,884,319 | 4/1959 | Fabian et al. | 75/0.5 |
| 2,935,400 | 5/1960 | Zeider et al. | 75/157 |

FOREIGN PATENT DOCUMENTS

| 168389 | 11/1950 | Austria | 75/157 |

OTHER PUBLICATIONS

Poster (ed.); "Handbook of Metal Powders", Rheinhold, N.Y., 1966, pp. 125–128.
P/M Literature Ref. Guide, 1974–1975, Am. Powder Met. Inst., 1975, p. 128.
Copper & Copper-Base Powder Alloys, Pub. Met. Powder Ind. Federation, Princeton, 1976, p. 36.

*Primary Examiner*—L. Dewayne Rutledge
*Assistant Examiner*—Upendra Roy
*Attorney, Agent, or Firm*—Clarence A. O'Brien; Harvey B. Jacobson

[57] ABSTRACT

A non-ferrous powder formed of a prealloy of copper, tin and zinc, the present article of manufacture exhibits sufficient green strength to allow direct compacting and sintering of useful articles from the "as atomized" form. The present prealloy powder is preferably air atomized from an alloy of copper, tin and zinc, the respective nominal weight percents of the components in the resulting prealloy powder being 89%, 9% and 2%. The present prealloy powder is preferably lubricated with conventional dry organic lubricants and can optionally be blended with carbonyl iron, carbonyl iron nominally comprising 1.0% to 3.0% by weight of the powder.

5 Claims, No Drawings

COMPOSITION FOR ATOMIZED ALLOY BRONZE POWDERS

BACKGROUND OF THE INVENTION

1. Field of the Invention

The invention relates generally to atomized non-ferrous metal powders and particularly to an air atomized prealloyed powder comprised of copper, tin and zinc and having high green strength in the "as atomized" form.

2. Description of the Prior Art

Certain non-ferrous powders available for powder metallurgical usage are formed according to a variety of techniques, the prior techniques requiring multi-step processing in order that a necessary degree of "green strength" be imparted to the powder. Such powders are subjected to compacting pressures in forming dies, the "cold compact" thus formed being required to exhibit a given degree of mechanical integrity after compacting in order to allow physical movement from the compacting press equipment to the trays or belts employed in sintering operations performed in a furnace. In order that a metal powder be capable of such mechanical integrity, the green strength of the powder must be of a given degree. In U.S. Pat. No. 3,888,657, for example, acceptable green strength is imparted to semi-irregular powders by thermal sintering and agglomeration of powder fines to form a sinter cake. The cake or agglomerated mass is then disintegrated or broken down to fine particles, such as by milling, the fine particles consisting of agglomerated fines. The semi-irregular powders thus formed have a green strength adequate to produce a suitable "cold compact" necessary to allow further processing.

In the aforesaid patent, it is indicated that metal powders formed by atomization have poor green strength. The green strength of "as atomized" metal powders treated according to the above-described process of said patent was increased by a factor of ten over the relatively poor green strength of the atomized powder. The present invention provides a prealloy powder which in the "as atomized" condition does not require further processing or modification by secondary operations to impart a desired high degree of green strength to the powder.

In U.S. Pat. No. 3,832,156, metal powders formed of either spherical copper or prealloy bronze and having extremely low green strength in the "as atomized" forms were converted to powders of an irregular form to increase the green strength thereof. This conversion was effected by secondary operations, such as ball milling, annealing and disintegration, the secondary operations being necessary to impart sufficient green strength to the "as atomized" metal powders to allow for the compacting and sintering of useful articles. The necessary green strength provided to the "as atomized" metal powders was accomplished by modification of particle shape only by the use of secondary operations performed after atomization of the powders into a relatively low green strength form. The present invention provides a prealloy powder of copper, tin and zinc which has sufficient green strength in the "as atomized" form to allow for the immediate compacting and sintering of useful articles without the need for modification of particle shape by secondary mechanical conversion.

SUMMARY OF THE INVENTION

The invention provides a method for making a prealloy non-ferrous metal powder by atomization, the article of manufacture thus formed having sufficient green strength to allow formation of useful articles through compacting and sintering processes without resorting to post secondary treatments. In particular, a prealloy bronze powder is provided by the present invention, the powder having a nominal composition of 89% copper, 9% tin, and 2% zinc. The prealloy bulk material can be atomized by conventional air atomization techniques to provide a powder having a green strength of a sufficient degree to obviate the need for post secondary treatments. The prealloyed zinc modified bronze powder of the invention is, therefore, useful in a variety of applications, compacting of the powder within a compacting pressure range of 16 TSI to 40 TSI providing corresponding densities equating to parameters necessary to produce medium porosity high strength bushing/bearings and high density structural parts. Since the present powder is prealloyed, segregation of metallic constituents can not occur and cannot, therefore, affect lot uniformity.

The present prealloyed powder exhibits high green strength at briquetting pressures of 20 TSI, green strength increasing well with increasing compacting pressure. Additionally, sintered yield strengths of the present prealloy in the "as atomized" powder form are higher than those of standard bronzes and brasses at comparable densities. The compressability of the present powder is also comparable to common brass powders. Further, the sintered ductility of the present prealloy powder is adequate to allow for repress or sizing, densities of above 90% of theoretical being obtained on cold repressing at 30 TSI. The present powder also exhibits a compression ratio of approximately 2:1 with regard to lubricated powder apparent density.

The present prealloy powder is preferably lubricated with a dry organic lubricant such as the commercially available Nopcowax or lithium stearate, lithium stearate being used if additional lubrication is necessary to minimize any adverse effect on compressibility.

The air atomization techniques and equipment useful for forming the present prealloyed zinc modified bronze powder are conventional. While metal powders, such as prealloy powders of copper and bronze, have previously been formed using conventional atomization techniques, these powders have spherical or spherical/nodular particles. Powders formed of particles so shaped do not have sufficient mechanical integrity or green strength at typical compacting pressures to allow handling of the "cold compact". The addition of zinc to the prealloy of copper and tin provides the necessary green strength by atomization techniques without secondary mechanical processing.

Elemental blends of 90% copper and 10% tin are commonly used in the powder metallurgy industry for production of useful articles. The prealloy high green strength powder of the present invention can be used similarly to these previously available powders, the powder of the invention being capable of being both produced and utilized with existing equipment and techniques. However, as aforesaid, the present powder is metallurgically homogeneous and is not thereby subject to elemental segregation. Use of the present powder thereby results in a homogeneous, consistent sintered structure.

The present prealloy powder can be admixed with carbonyl iron, a well-known powder metallurgy material formed from iron pentacarbonyl for enhancement of sintered mechanical strength and hardness.

Accordingly, it is an object of the present invention to provide a prealloy zinc modified bronze powder useful for a variety of powder metallurgy applications and formable by convention atomization techniques, the present powder having high green strength in the "as atomized" form and thereby not requiring the employment of post secondary treatments to produce a useful powder.

It is another object of the invention to provide a prealloy powder formed nominally of 89% copper, 9% tin, and 2% zinc, the powder being formed by atomization techniques and having desirable characteristics including high green strength in the "as atomized" form.

It is a further object of the invention to provide a prealloy zinc modified bronze powder of high green strength and having carbonyl iron admixed therewith to enhance sintered mechanical strength and hardness.

These together with other objects and advantages which will become subsequently apparent reside in the details of the invention as particularly described hereinafter.

DESCRIPTION OF THE PREFERRED EMBODIMENTS

Conventional practices in the powder metallurgy industry include the formation of atomized metal particulates by gas atomization or liquid atomization processes. As examples of the processes employed in the prior art and useful in the production of the present article of manufacture, U.S. Pat. Nos. 2,968,062 and 3,253,783 are referred to and are incorporated hereinto by reference, the said U.S. patents describing conventional gas atomization techniques. These conventional atomization techniques typically include the following steps:

(1) the charging of virgin, or prealloy metals, in ingot, slab, cathode, or shot (i.e., solid) forms into a melting furnace in "heats" typically weighing approximately 550 pounds;

(2) transferring the formulated molten heat to a horizontal induction holding furnace for further constituent homogenization and for temperature stabilization;

(3) flowing by virtue of the "head" of molten metal a liquid stream of the molten metal through a circular opening of a ceramic face plate fitted into the side of the holding furnace, the liquid stream being "formed" as said stream is pushed through the circular opening;

(4) directing the horizontal column of liquid metal through the center hole of an "atomizing nozzle" or annulus;

(5) disintegrating the stream of liquid metal on exit from the annular nozzle by a 360 degree peripheral stream of converging pressurized air, the air being typically pressurized to between 100 and 200 psi;

(6) collecting the atomized, disintegrated, or particulated metal (in hot powder form) which is carried by the atomizing air mass into a collection bin, the powder being air cooled in the collection bin;

(7) conveying the atomized powder from the bin to a screening device for "scalping" of oversize (unwanted) particles; and, (8) blending the appropriately sized atomized particles with dry organic lubricants prior to packaging and/or use.

The general method described above can be modified depending upon the alloy type and particle morphology desired by utilizing an atomizing or disintegration media other than air, typical atomizing media including water, steam, nitrogen, argon, and helium inter alia. Collection media can comprise water, particularly if quenching is desired or if the atomizing fluid media is other than air. Atomized powder disintegrated or collected by certain media may obviously require filtering and drying. Since the production of the present zinc modified bronze powder is preferably accomplished using air as the atomizing media, neither filtration nor drying need be performed. Depending upon the requirements of a user of the present powder, the atomized product may be treated further, such as by thermal treatment in a reducing atmosphere, to minimize oxide content, a certain degree of oxidation of the powder unavoidably occurring when an oxidizing atomizing media is used to form the powder. However, thermal reduction of the atomized metal powder of the present invention is not necessary in order to achieve the advantageous characteristics of the invention.

The bulk alloy material from which the present metal powders are formed by atomization techniques as aforesaid involve the alloy addition of zinc to copper and tin in order to form an alloy of copper, tin, and zinc. The bulk alloy in the form of ingots and slabs inter alia is charged into a melting furnace as aforesaid, the variation in constituent weight from charged heat to heat providing expected variations from a nominal composition from lot to lot of the prealloyed metal powder thus produced. Accordingly, the percentage ranges by weight of the several constituents of the prealloy metal powder of the invention are merely typical ranges, a nominal composition being obtained substantially as an average value within the limitations of the processing operations employed. In particular, the prealloy bronze powder of the present invention typically includes copper in the weight percent range of 87.5 to 90.5, a nominal value of copper present in the prealloy powder being 89%. Similarly, tin is present in the prealloy bronze powder in the weight percent range of 8.0 to 10.0, the nominal weight percent of tin typically given 9%. Within the weight percent ranges respectively given for copper and tin hereinabove, the weight percent of zinc in the prealloy bronze powder comprises the difference between the summations of the weight percentages of copper and tin and 100%. Nominally, zinc is present in the prealloy bronze powder of the invention in a weight percent of approximately 2%. In order to produce an acceptable metal powder article of manufacture, the combined weight percentages of copper and tin preferably do not exceed 98.5% at a maximum value. Accordingly, a preferred nominal weight percent composition of the present alloy bronze powder comprises 89% copper, 9% tin, and 2% zinc.

The prealloy zinc modified bronze powders of the present invention are typically lubricated according to prior practices by the addition of a dry organic lubricant to the metal powder, a basic lubricant comprising Nopcowax, a synthetic wax produced and marketed by the Nopco Chemical Company. The Nopcowax lubricant is preferably used at a nominal weight percent of 0.5% of the metal powder. When lubrication of an additional degree is necessary, it is desired to utilize lithium stearate rather than Nopcowax in order to minimize adverse effects on compressibility.

The metal powder of the invention lubricated as described above can be directly used in compacting and sintering operations as described hereinabove. In order to enhance sintered mechanical strength and hardness, a fine iron powder comprised of carbonyl iron can be added to the present metal powder in a weight percent range of up to 3.0%. The carbonyl iron power which can be admixed with the present metal powder is well-known in the art, the additive being preferably formed of iron pentacarbonyl.

The alloy addition of zinc according to the present invention results in an air atomized powder having particles more irregular in shape than comparable air atomized compositions not containing zinc. This greater degree of irregularity provides the green strength necessary upon cold consolidation for typical processing of powder metallurgy structures. The characteristics thus produced by the addition of zinc to the prealloy provides characteristics and advantages not heretofore obtainable by atomization techniques, the characteristics of the resulting "as atomized" metal powder being completely unexpected to one of ordinary skill in the art. In order to demonstrate the unexpected advantages and characteristics of the present prealloy metal powders, similar powders were tested, certain of the powders having prealloy zinc according to the present invention and certain other powders not having the prealloy zinc of the present invention. The several powders thus described were further tested with and without lubricants in order to study both the natural non-lubricated green strength and the lubricated green strength of the several powders involved in the testing. The lubricants employed were of the type normally employed in powder metallurgy parts fabrication for facilitating removal from forming dies after cold compacting has taken place. The lubricants used in the comparative study comprises Nopcowax as described hereinabove.

EXAMPLE I

A prealloy zinc modified bronze metal powder was produced by air atomization according to the methodology generally described hereinabove, the weight percents of the several constituents of the prealloy being 89% copper, 9% tin, and 2% zinc. The "as atomized" powder of the invention was screened to a particle size of 60 mesh and 100 mesh in differing lots. At compacting pressures of 30 and 48 tons per square inch, the respective green densities in grams per cubic centimeter and green strength in pounds per square inch of the non-lubricated powder was respectively 7.23 grams/cubic centimeter and 2300 psi at 30 TSI and 7.87 grams per cubic centimeter and 4,650 psi at 48 TSI. The lubricated powder exhibited a green density of 7.42 grams per cubic centimeter and a green strength of 900 psi at 30 TSI, a green density of 7.92 grams per cubic centimeter and a green strength of 1,860 psi at 48 TSI being exhibited.

EXAMPLE II

A metal powder comprising a prealloy of 90% copper and 10% tin was formed by air atomization techniques as described hereinabove, the "as atomized" metal powder having a non-lubricated green density of 7.39 grams per cubic centimeter and a green strength of 1420 psi at a compacting pressure of 30 TSI. The non-lubricated copper/tin prealloy metal powder had a green density of 7.97 grams per cubic centimeter and a green strength of 2,870 psi at 48 TSI. At a compacting pressure of 30 TSI, the lubricated copper/tin prealloy metal powder had a green density of 7.51 grams per cubic centimeter and a green strength of 700 psi. At a compacting pressure of 48 TSI, the lubricated copper/tin prealloy metal powder had a green density of 8.00 grams per cubic centimeter and a green strength of 1,200 psi.

The following table summarizes comparative test data as provided above and includes additional test data not directly provided in the Examples given:

TABLE I

COMPARATIVE TEST RESULTS OF PREALLOYED POWDERS

| | % CU | % SN | % ZN | COMPACTING PRESSURE TONS. IN2 | NON-LUBRICATED GREEN DENSITY G/CM3 PSI | NON-LUBRICATED GREEN STRENGTH G/CM3 | LUBRICATED GREEN DENSITY PSI | LUBRICATED GREEN STRENGTH |
|---|---|---|---|---|---|---|---|---|
| (1) | 89 | 9 | 2 | 30 | (7.23) | 2,300 | (7.42) | 900 |
|  | 89 | 9 | 2 | 48 | (7.87) | 4,650 | (7.92) | 1,860 |
| (2) | 90 | 10 | — | 30 | (7.39) | 1,420 | (7.51) | 700 |
|  | 90 | 10 | — | 48 | (7.97) | 2,870 | (8.00) | 1,200 |
| (3) | 93.5 | 5 | 1.5 | 30 | (7.67) | 680 | (7.68) | 780 |
|  | 93.5 | 5 | 1.5 | 48 | (8.17) | 1,360 | (8.10) | 1,330 |
| (4) | 95 | 5 | — | 30 | (7.67) | 1,200 | (7.75) | 570 |
|  | 95 | 5 | — | 48 | (8.18) | 2,140 | (8.15) | 840 |

From the data provided in Examples I and II and in Table I, it can be seen that the prealloyed metal powders formed of copper, tin, and zinc according to the invention exhibit green strength substantially greater than the non-zinc counterpart alloys, that is, the 89%/9%/2% alloy of copper/tin/zinc of Example I providing a substantial improvement over the prealloy of 90% copper and 10% tin of Example II. Similarly, the copper/tin/zinc prealloyed metal powder of No. 3 in Table I exhibits green strengths substantially greater than the 95%/5% alloy of copper and tin of No. 4 in the lubricated forms, the lubricated forms being the essentially useful forms of such powders.

EXAMPLE III

A prealloyed zinc modified bronze powder formed by atomization according to the present invention was lubricated with 0.5 Nopcowax the nominal weight percentages of copper/tin/zinc in the powder being 89%/9%/2%, respectively. The powder so formed was not provided with an iron carbonyl additive, the powder further exhibiting a lubricated apparent density of 3.6 to 3.8 grams per cubic centimeter and a lubricated flow of 25 to 35 seconds per 50 grams. Test compacts of the metal powder so formed were sintered for 30 minutes at 1550 degrees F. in a disassociated ammonia atmosphere, the test compacts having the following characteristics:

|  | GREEN DENSITY GRAMS/CC | | | |
| --- | --- | --- | --- | --- |
|  | 6.6 | 7.0 | 7.4 | 7.8 |
| Briquetting Pressure PSI (× 1,000) | 32 | 44 | 62 | 84 |
| Green Strength PSI | 400 | 800 | 1,600 | 3,400 |
| Transverse Strength PSI (× 1,000) | 53 | 63 | 78 | 81 |
| Dimensional Change % | −2.2 | −1.8 | −1.6 | −0.3 |
| Hardness R/ | H71 | H77 | H87 | H86 |
| Yield Strength (Tension) PSI @ 0.2% offset (× 1,000) | 10 | 16 | 17 | 20 |
| Sintered Density gms/cm$^3$ | 7.2 | 7.5 | 7.8 | 7.9. |

It is to be noted that temperatures above 1550 degrees F. typically result in blistering, especially at densities above 7.4 grams per cubic centimeter. Repress tests at 30 TSI were conducted on the above test compacts, the yield strength values thus obtained from repressed transverse bars being given, along with other characteristics, below, the yield in deflection being related to yield in tension in the "as pressed" and sintered forms:

|  | GREEN DENSITY GRAMS/CC | | | |
| --- | --- | --- | --- | --- |
| REPRESS @ 30 TSI | 6.6 | 7.0 | 7.4 | 7.8 |
| Transverse Strength PSI (× 1,000) | 66 | 76 | 83 | 86 |
| Hardness R/ | B36 | B41 | B45 | B48 |
| Yield Strength PSI (× 1,000) | 21 | 25 | 28 | 28 |
| Density gms/cc | 7.85 | 7.9 | 8.1 | 8.2. |

EXAMPLE IV

A prealloyed bronze powder having the composition of Example III and admixed with iron carbonyl present in the resulting admixture in a weight percentage of 1.0% of the weight of the prealloyed metal powder was lubricated with Nopcowax at a weight percent of 0.5% of the weight of the prealloyed metal powder, the lubricated apparent density of the resulting powder being 3.6 to 3.8 grams per cubic centimeter and the lubricated flow being 25 to 35 seconds per 50 grams. Test compacts sintered for 30 minutes at 1550 degrees F. in a dissociated ammonia atmosphere exhibited the following characteristics:

|  | GREEN DENSITY GRAMS/CC | | | |
| --- | --- | --- | --- | --- |
|  | 6.6 | 7.0 | 7.4 | 7.8 |
| Briquetting Pressure PSI (× 1,000) | 32 | 44 | 62 | 84 |
| Green Strength PSI | 400 | 800 | 1,600 | 3,400 |
| Transverse Strength PSI (× 1,000) | 57 | 70 | 84 | 83 |
| Dimensional Change % | −2.2 | −2.0 | −1.6 | −0.3 |
| Hardness R/ | H68 | H81 | B25 | B30 |
| Yield Strength (Tension) PSI @ 0.2% offset (× 1,000) | 12 | 16 | 20 | 21 |
| Sintered Density gms/cm$^3$ | 7.1 | 7.5 | 7.8 | 7.85. |

Repress characteristics of the type obtained relative to Example III were as follows:

|  | GREEN DENSITY GRAMS/CC | | | |
| --- | --- | --- | --- | --- |
| REPRESS @ 30 TSI | 6.6 | 7.0 | 7.4 | 7.8 |
| Transverse Strength PSI (× 1,000) | 78 | 87 | 91 | 99 |
| Hardness R/ | B42 | B42 | B43 | B45 |
| Yield Strength PSI (× 1,000) | 24 | 28 | 29 | 29 |
| Density gms/cc | 7.8 | 7.9 | 8.1 | 8.3. |

As shown by the Examples given hereinabove, the mechanical properties of the present prealloy zinc modified bronze powder after heat conditioning, that is, sintering, are clearly an improvement as compared with the mechanical properties obtainable from common bronze elemental powder blends. The metallurgically homogeneous prealloyed bronze powders according to the present invention further eliminate elemental segregation encountered in elemental blends of metal powders, thereby providing a homogeneous consistent sintered structure. The present prealloyed bronze powders further exhibit improved sinter ductility, thereby allowing for improvement of mechanical properties through repressing/densification processes. The sintered dimensional characteristics, that is, shrinkage, of the present prealloyed zinc modified bronze metal powders allows fabrication of high density structures. It is to be noted that elemental blends of copper and tin, as sintered, normally do not densify upon sintering to the same high density levels. Relative to the Examples provided by Examples III and IV, admixture of iron carbonyl with the present prealloyed zinc modified bronze powder of the invention enhances sintered mechanical strength and hardness.

Accordingly, the present invention provides a prealloyed zinc modified bronze powder having improved characteristics, particularly green strength characteristics, relative to similarly utilized prealloyed copper/tin metal powders and elemental blends of copper and tin. It is to be understood that the foregoing examples are illustrative only and that the invention is to be limited only by the scope of the claims appended hereto.

What is claimed as new is as follows:

1. A prealloyed atomized metal powder having high green strength in the as atomized form wherein the nominal percentage of copper is 89 percent, the nominal percentage of tin is 9 percent, and the nominal percentage of zinc is 2 percent.

2. A prealloyed atomized metal powder having high green strength in the as atomized form and consisting essentially of 87.5 to 90.5 percent by weight of copper, 8.0 to 10.0 percent by weight of tin, a lubricant, and the balance being zinc, the lubricant being a dry organic synthetic wax material normally present in a nominal weight percentage of 0.5 percent of the metal powder.

3. The powder of claim 2 wherein the lubricant is nominally present in a weight percentage of 0.5 percent of the metal powder.

4. A prealloyed atomized metal powder having high green strength in the as atomized form and consisting essentially of 87.5 to 90.5 percent by weight of copper, 8.0 to 10.0 percent by weight of tin, and further containing iron carbonyl admixed with the metal powder with the balance being zinc.

5. The powder of claim 4 wherein the iron carbonyl is nominally present in a weight percentage up to 3.0 percent of the metal powder.

* * * * *

UNITED STATES PATENT AND TRADEMARK OFFICE
CERTIFICATE OF CORRECTION

PATENT NO. : 4,169,730
DATED : October 2, 1979
INVENTOR(S) : Paul E. Matthews and Kenneth C. Ramsey It is certified that error appears in the above-identified patent and that said Letters Patent are hereby corrected as shown below:

Column 1, line 26, cancel "strengh" insert --strength--; column 2, line 31, cancel "compressability" insert --compressibility--.

TABLE I, in the column having a heading "COMPACTING PRESSURE", cancel "TONS.IN2" insert --TONS/IN$^2$--; in the first column having a heading "GREEN DENSITY" cancel "G/CM3PSI" insert --G/CM$^3$--; in the first column having a heading "GREEN STRENGTH" cancel "G/CM3" insert --PSI--; in the second column having a heading "GREEN DENSITY" cancel "PSI" insert --G/CM$^3$--; in the second column having a heading "GREEN STRENGTH", under "STRENGTH" insert --PSI--.

column 6, line 68, cancel "disassociated" insert --dissociated--.

Signed and Sealed this

Fifteenth Day of July 1980

[SEAL]

Attest:

SIDNEY A. DIAMOND

Attesting Officer          Commissioner of Patents and Trademarks